United States Patent
Arras

(10) Patent No.: US 10,100,783 B2
(45) Date of Patent: Oct. 16, 2018

(54) FILTER ARRANGEMENT OF A VEHICLE

(71) Applicant: Bayerische Motoren Werke Aktiengesellschaft, Munich (DE)

(72) Inventor: Emmanuel Arras, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/426,261

(22) Filed: Feb. 7, 2017

(65) Prior Publication Data

US 2017/0145964 A1    May 25, 2017

Related U.S. Application Data

(63) Continuation of application No. PCT/EP2015/067620, filed on Jul. 31, 2015.

(30) Foreign Application Priority Data

Aug. 11, 2014 (DE) .................. 10 2014 215 909

(51) Int. Cl.
*F02M 37/22* (2006.01)
*F02M 25/08* (2006.01)
*B60K 15/03* (2006.01)
*G01G 3/16* (2006.01)

(52) U.S. Cl.
CPC ......... *F02M 25/0854* (2013.01); *B60K 15/03* (2013.01); *F02M 25/089* (2013.01); *G01G 3/165* (2013.01); *B60K 2015/03236* (2013.01)

(58) Field of Classification Search
CPC .. F02M 25/0854; F02M 25/089; G01G 3/165; B60K 15/03; B60K 2015/03236

USPC ...................................... 123/518, 519, 198 E
See application file for complete search history.

(56) References Cited

U.S. PATENT DOCUMENTS

| | | | |
|---|---|---|---|
| 2,305,783 A | 12/1942 | Heymann et al. | |
| 8,529,659 B2 * | 9/2013 | Streib | F02M 25/0809 |
| | | | 123/518 |
| 2011/0100210 A1 | 5/2011 | Streib et al. | |

(Continued)

FOREIGN PATENT DOCUMENTS

| | | |
|---|---|---|
| DE | 44 08 647 A1 | 9/1994 |
| DE | 10 2006 027 572 A1 | 12/2007 |
| DE | 10 2008 001 447 A1 | 11/2009 |

(Continued)

OTHER PUBLICATIONS

German-language Search Report issued in counterpart German Application No. 10 2014 215 909.1 dated Apr. 20, 2015 with partial English translation (12 pages).

(Continued)

*Primary Examiner* — Hai Huynh
(74) *Attorney, Agent, or Firm* — Crowell & Moring LLP

(57) ABSTRACT

A filter arrangement of a vehicle includes a filter, preferably an active carbon filter, a sprung suspension for the vibrational mounting of the filter in the vehicle, a sensor unit for determining a variable corresponding to the current weight of the filter from a vibrational movement of the filter, and an analyzing unit for calculating a filling degree of the filter from the filter weight determined, taking the empty weight of the filter into account. The filter is suspended such that the filter can vibrate about a rotational axis fixed to the vehicle.

14 Claims, 3 Drawing Sheets

(56) References Cited

U.S. PATENT DOCUMENTS

2015/0144110 A1    5/2015   Meilenz

FOREIGN PATENT DOCUMENTS

EP          2 878 798 A1    6/2015
JP          2004-353555 A   12/2004

OTHER PUBLICATIONS

International Search Report (PCT/ISA/210) issued in PCT Application No. PCT/EP2015/067620 dated Oct. 30, 2015 with English translation (6 pages).
German-language Written Opinion (PCT/ISA/237) issued in PCT Application No. PCT/EP2015/067620 dated Oct. 30, 2015 (5 pages).

* cited by examiner

FILTER ARRANGEMENT OF A VEHICLE

CROSS REFERENCE TO RELATED APPLICATIONS

This application is a continuation of PCT International Application No. PCT/EP2015/067620, filed Jul. 31, 2015, which claims priority under 35 U.S.C. § 119 from German Patent Application No. 10 2014 215 909.1, filed Aug. 11, 2014, the entire disclosures of which are herein expressly incorporated by reference.

BACKGROUND AND SUMMARY OF THE INVENTION

The present invention relates to a filter arrangement of a vehicle. Concerning the state of the art, reference is made to German patent document DE 10 2006 027 572 A1.

To obtain marketing authorization for a vehicle, specific test cycles have to be driven, for example, to prove that the hydrocarbon emission limit values are maintained. So that no hydrocarbons are released into the atmosphere, an activated carbon filter is disposed between the tank and the atmosphere in the case of motor vehicles having an Otto engine. This activated carbon filter absorbs the gaseous hydrocarbons from the tank ventilation system. However, the activated carbon filter has to be regenerated on a regular basis. The regeneration takes place by way of the internal-combustion engine driving the vehicle, which internal-combustion engine generates a vacuum and can thereby take in air from the environment through the activated carbon filter. In this case, the previously stored hydrocarbons separate from the activated carbon filter and, together with the ambient air, arrive in the internal-combustion engine, where they are burned. However, this quasi external source of hydrocarbons is an "interference" for the engine, and its influence or effect on the internal-combustion engine therefore has to be predicted as accurately as possible, in order to mutually adapt the taken-in quantity and the normal injection of gasoline. During the regeneration of the activated carbon filter, the hydrocarbon concentration in the scavenging air, i.e. in the air stream taken in by the internal-combustion engine through the activated carbon filter, will also fluctuate. This concentration in the scavenging air is, among other factors, a function of the volumetric efficiency of the activated carbon filter.

In the initially mentioned document, a method and a device are described for determining the loading of a fuel vapor temporary storage device in the case of internal-combustion engines, in which case the above-mentioned volumetric efficiency is determined from the vibration behavior of the activated carbon filter. For this purpose, the activated carbon filter is swingably suspended by way of two spring elements with a degree of freedom in the gravitational direction of the earth, although the schematic diagram of this document does not clearly indicate how this suspension is concretely implemented. However, it is clearly shown that the activated carbon filter in the area of a right side of its housing and in the area of a left side of its housing is in each case swingably suspended by way of a spring element in the gravitational field of the earth.

The above-described known spring-mounted suspension may, however, result in undefined or not clearly analyzable vibrations, particularly when the right-side and the left-side spring elements are expanded to different degrees.

It is an object of the present invention to provide a filter arrangement of a vehicle in which only unambiguous and therefore clearly analyzable vibrations or vibrating motions of the activated carbon filter can occur.

This and other objects are achieved by a filter arrangement of a vehicle, particularly a motor vehicle, comprising a filter. In particular, the filter is an activated carbon filter for filtering hydrocarbons in the waste air of a tank of the vehicle. By way of the following description, it will, however, be demonstrated that the invention, especially the weighing of the filter and the determination of the volumetric efficiency of the filter based on the weight, can also be applied to additional filters in a motor vehicle, for example, to dust filters and the like. Furthermore, the filter arrangement according to the invention comprises a spring-mounted suspension of the filter in the vehicle such that the filter is suspended swingably about a vehicle-fixed axis of rotation. Furthermore, a sensor unit is provided which is designed for determining the weight of the filter. In this case, the term "weight" is synonymous with the term "mass".

In addition, an analyzing unit is provided. The empty weight of the filter can be stored in the analyzing unit. The analyzing unit is designed for calculating the filling degree of the filter. This calculation takes place on the basis of the empty weight and the determined weight. In this case, the empty weight is subtracted from the determined weight, in order to obtain the weight of the charge of the filter. The weight of the charge of the filter corresponds to the "filling degree". Based on the calculated filling degree of the filter, further steps can be initiated in the vehicle. It is therefore, for example, contemplated, as described in the following, to appropriately actuate the internal-combustion engine as well as the normal valves of the tank ventilation system of the vehicle based on the calculated filling degree. In addition, for example, a status message or a fault report can be emitted in the vehicle when a defined filling degree has been reached.

The sensor unit is designed for measuring a vibration of the filter, the filter being able to vibrate only in a single possible defined fashion, specifically about an axis of rotation, with respect to which the filter is suspended or disposed in a swingable manner. The measurement by the sensor unit thereby supplies an unambiguous correct result. Based on the measured vibration, advantageously the natural frequency of the spring-mass system formed by the filter as well as a suitable spring element is determined, by way of which spring element, the filter is appropriately supported. Based on the natural frequency, in turn, the weight of the filter can be calculated, because the natural frequency is inversely proportional to the square root of the mass (weight).

It is further provided that the sensor unit comprises a sensor. This sensor is used for measuring the vibration of the filter. A magnetic coil sensor, for example, is provided as a sensor, which is correspondingly connected with the filter or the spring-mounted suspension of the filter. As an alternative, the vibration can be measured by use of an optical sensor.

The vibration of the filter can be caused by the natural movement of the vehicle. As an alternative or in addition, a targeted vibration stimulation can take place by use of an actuator. The function of the actuator of the sensor unit may preferably be integrated in the magnetic coil sensor. Thus, by correspondingly actuating the coil, the magnetic coil sensor can be used not only for measuring the vibration but also for stimulating the filter. The magnetic coil sensor has an advantage over an optical sensor in that the magnetic coil sensor can be used as an actuator. In view of a vibration stimulation for the filter by the vehicle itself, i.e. as a result of its movement, which also for energy-related reasons is particularly advantageous, a swingable suspension of the filter, specifically in a rotatable or swingable manner about a vehicle-fixed axis of rotation, is also particularly advantageous. By means of the suggested arrangement, the filter will then be caused to move in the case of each significant acceleration operation and braking operation, when the axis of rotation extends in the direction of the transverse vehicle axle (and at least approximately parallel to the ground). In this sense, the invention also includes a vehicle having a filter arrangement according to the invention, wherein the sensor unit and/or the analyzing unit is/are designed for determining the actual weight of the filter while the vehicle is at least approximately stopped, the vibrating motion of the filter being a result of a preceding braking operation of the vehicle. The risk of faults as a result of a new vibration stimulation because of a changed vehicle movement is thereby minimized.

Facultatively, the same also applies to an alternative arrangement of the filter according to the invention in the vehicle, specifically when the above-mentioned axis of rotation extends essentially in the direction of the vertical axis of the vehicle (and therefore at least approximately perpendicularly with respect to the ground). The filter will then be caused to move in the case of any significant yaw movement (cornering) of the vehicle. In contrast, in the case of a filter arrangement according to the initially mentioned state of the art, only vertical (actually undesirable on the part of the vehicle occupants) vibrations of the vehicle body may cause a vibration stimulation of the filter.

The invention further includes a vehicle having a filter arrangement according to the invention, wherein the filter is designed for filtering waste air, which originates from the fuel tank of the vehicle. This particularly relates to a vehicle having an Otto engine, wherein the filter is constructed as an activated carbon filter for filtering hydrocarbons. The filter in the vehicle is advantageously connected with the tank by way of a corresponding pipe. An additional pipe connects the filter with the vehicle internal-combustion engine. Furthermore, the filter is connected with the atmosphere.

It is preferably provided that the internal-combustion engine of the vehicle is designed for regenerating the filter. For this regeneration operation, the engine is correspondingly actuated for taking in air by way of the filter. In the process, the hydrocarbons will then separate in the filter and burn in the engine. Advantageously, an engine control unit is provided which can correspondingly actuate the engine in order to take in air by way of the filter and inject the correct amount of fuel. As a result of the calculation of the filling degree of the filter, this regeneration of the filter can be carried out in a precise manner, if required. For this purpose, the actuation of the engine takes place as a function of the calculated filling degree.

Furthermore, a method of operating the described filter arrangement and for operating the described vehicle, respectively, is provided. In this case, a determination of the weight of the filter and a calculation of the filling degree of the filter take place according to an advantageous further development from a calibrating step for determining the empty weight of the filter. Thus, within the scope of the method, it is provided in particular that the vibration of the filter is measured, and based on the vibration, the natural frequency is calculated. Based on the natural frequency, the weight of the filter is calculated. Furthermore, a process step for calibrating the system is provided. When calibrating the system, a determination of the weight takes place directly after a long phase of regeneration, thus, the taking-in of air by the engine. This weight is stored and is taken into account in the subsequent calculations of the filling degree. In particular, the weight determined directly after the regeneration of the filter, is stored as "empty weight".

Other objects, advantages and novel features of the present invention will become apparent from the following detailed description of one or more preferred embodiments when considered in conjunction with the accompanying drawings.

DETAILED DESCRIPTION OF THE DRAWINGS

FIGS. 1 to 4 are purely schematic views of filter arrangements 1 of the invention according to different embodiments. The embodiments differ with respect to the further developments of a spring-mounted suspension 6 of the individual filters 8 in the vehicle 2.

Figure 1:
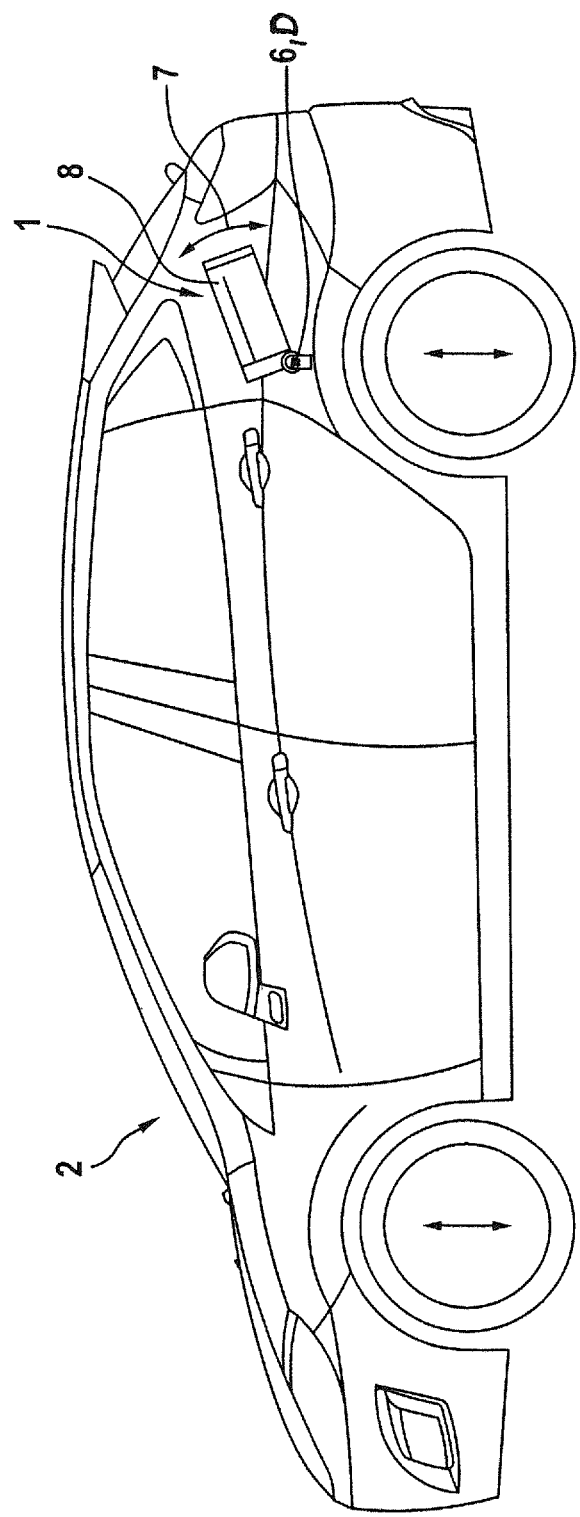
FIG. 1 is a view of the vehicle having a filter arrangement of the invention according to a first embodiment.

FIG. 1 illustrates the arrangement of the filter arrangement 1 in the vehicle 2. In this case, a filter 8 of the filter arrangement 1 is swingably suspended by way of a spring-mounted suspension 6 in the vehicle 2 about a vehicle-fixed axis of rotation D—the latter extends perpendicularly to the plane of the drawing and extends in the transverse direction of the vehicle. As such, the filter 8 can carry out an oscillating rotational vibration in the direction of the arrow 7 about the axis of rotation D. In an intermediate position illustrated (as the rest position) in the figures, which is possibly situated between two end stops spaced relatively far from one another for this oscillating rotational vibration, the filter 8 is held by a spring arrangement, which is not shown, or at least one suitable spring element (constructed, for example, as a coil spring). The filter arrangement 1 therefore represents a swingable spring-mass system.

Figure 2:
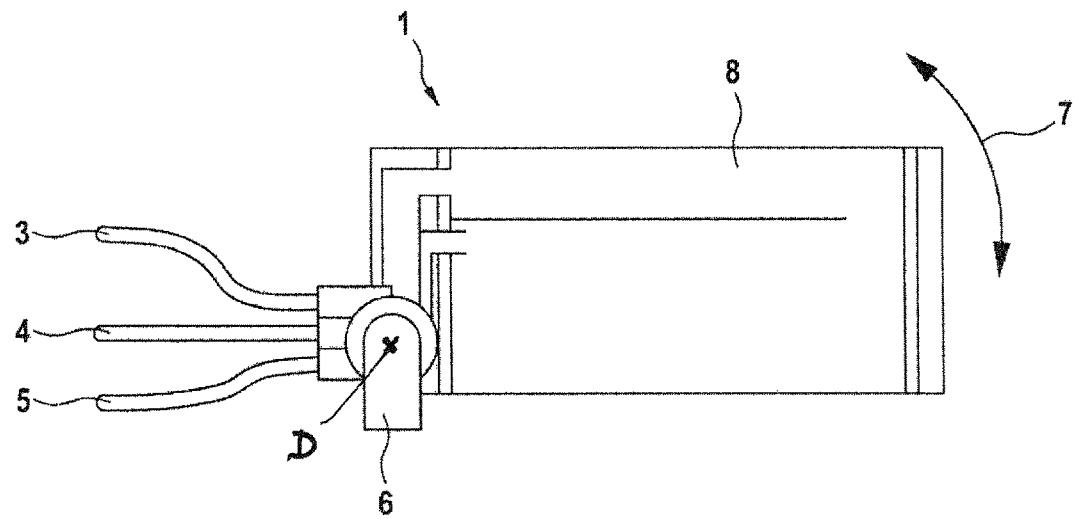
FIG. 2 is a view of the filter arrangement according to the first embodiment.

FIG. 2 shows a detail of the filter arrangement 1 of FIG. 1 with a slightly different position of the filter 8; i.e. here, the filter 8 is not situated in the rest position or intermediate position illustrated in FIG. 1. Here, the filter 8 of the filter arrangement 1 is an activated carbon filter in a tank ventilation system of the vehicle 2. The filter or activated carbon filter 8 is connected in a conventional manner by way of a first connection 3 with the atmosphere or a tank leak diagnostic system, dust filter, etc., which are not shown. A second connection 4 connects the filter 8 with an internal-combustion engine, not shown, of the vehicle 2. A third connection 5 connects the filter 8 with a tank, not shown, of the vehicle 2.

The connections 3, 4, 5 have a gas-conducting construction. By way of the third connection 5, waste air flows from the fuel tank of the vehicle 2 through the filter 8 into the first connection 3 and thereby into the atmosphere. The filter 8 is constructed as an activated carbon filter and filters hydrocarbons from the waste air of the tank. The second connection 4 is provided for a regeneration of the filter 8. By way of the second connection 4, the internal-combustion engine can take in air by way of or through the filter 8. In this case, the hydrocarbons are separated from the filter and can then be burnt in the engine.

As mentioned in connection with FIG. 1, the filter 8, together with its housing, is suspended to be swingable about a vehicle-fixed axis of rotation D, which in FIG. 2 as well as in FIG. 1 extends in the vehicle transverse direction, preferably at least approximately horizontally, i.e. parallel to the ground. The situation or position of the filter 8 illustrated in FIG. 2 is different from that of FIG. 1. The axis of rotation D (which here is also perpendicular to the plane of the drawing) preferably extends eccentrically through the housing of the filter 8 or through a housing extension such that the axis of rotation D definitely does not extend through the center of mass of the filter 8. When the rest position of the filter 8 is as illustrated in FIG. 1, it is at least ensured that, because of the construction of the filter arrangement 1 as a spring-mass system, the filter 8 is caused to carry out a vibrating movement in the direction of the arrow 7 at least in the case of more intensive positive or negative longitudinal acceleration operations of the vehicle 2. If the rest position of the filter were as illustrated in FIG. 2, a vibrating movement of the filter 8 would occur as a result of a longitudinal acceleration of the vehicle practically only resulting from compression and rebounding processes of the chassis of the vehicle. In contrast, with a rest position according to FIG. 1, the filter 8 is always caused to vibrate in the case of a longitudinal acceleration of the vehicle. Besides, with a rest position according to FIG. 1 as well as according to FIG. 2, the filter 8 is caused to carry out a rotational vibrating movement 7 about the axis of rotation D by vertical movements of the vehicle body with respect to the road, which are outlined in FIG. 1 by vertical arrows in the vehicle wheels, because of its attribute as a swingably suspended spring-mass system.

However, the filter 8 can carry out a vibration 7 not only as actuated by stimulation by way of the vehicle 2 or its movement but, as an alternative or in addition, also by an independent vibration stimulation. Such an independent vibration stimulation can in this case take place in a manner not shown here by the suspension 6 appropriately constructed for this purpose in that an appropriately designed actuator (not shown) is provided in this suspension 6.

Figure 3:
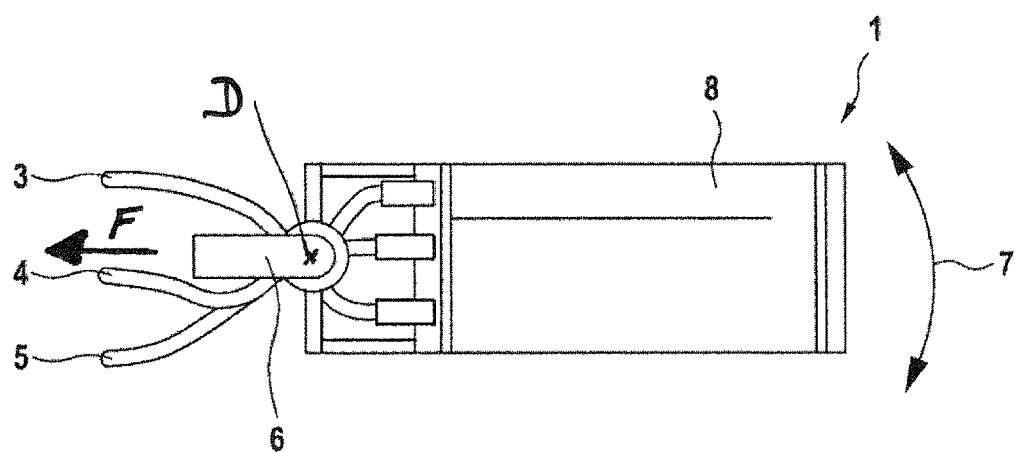
FIG. 3 is a view of a filter arrangement according to a second embodiment.

Also in the case of the embodiment according to FIG. 3, the filter 8 is swingably suspended by way of a spring-mounted suspension 6, and in this case is sufficiently freely movable in order to carry out a desired vibration 7 about the axis of rotation D. This axis of rotation D, which here again extends perpendicularly to the plane of the drawing, in this embodiment according to FIG. 3, in reality also extends perpendicularly, i.e. perpendicularly to the (normally) horizontally situated road, on which the vehicle 2 is moving according to the direction of the arrow F while at first driving straight ahead. By means of such an arrangement of the axis of rotation D with respect to the filter 8, the latter is caused to carry out a vibration movement according to arrow 7 by yaw movements of the vehicle 2, i.e. when the latter corners sufficiently rapidly. Naturally here also, an actuator may be provided for a vibration stimulation.

Figure 4:
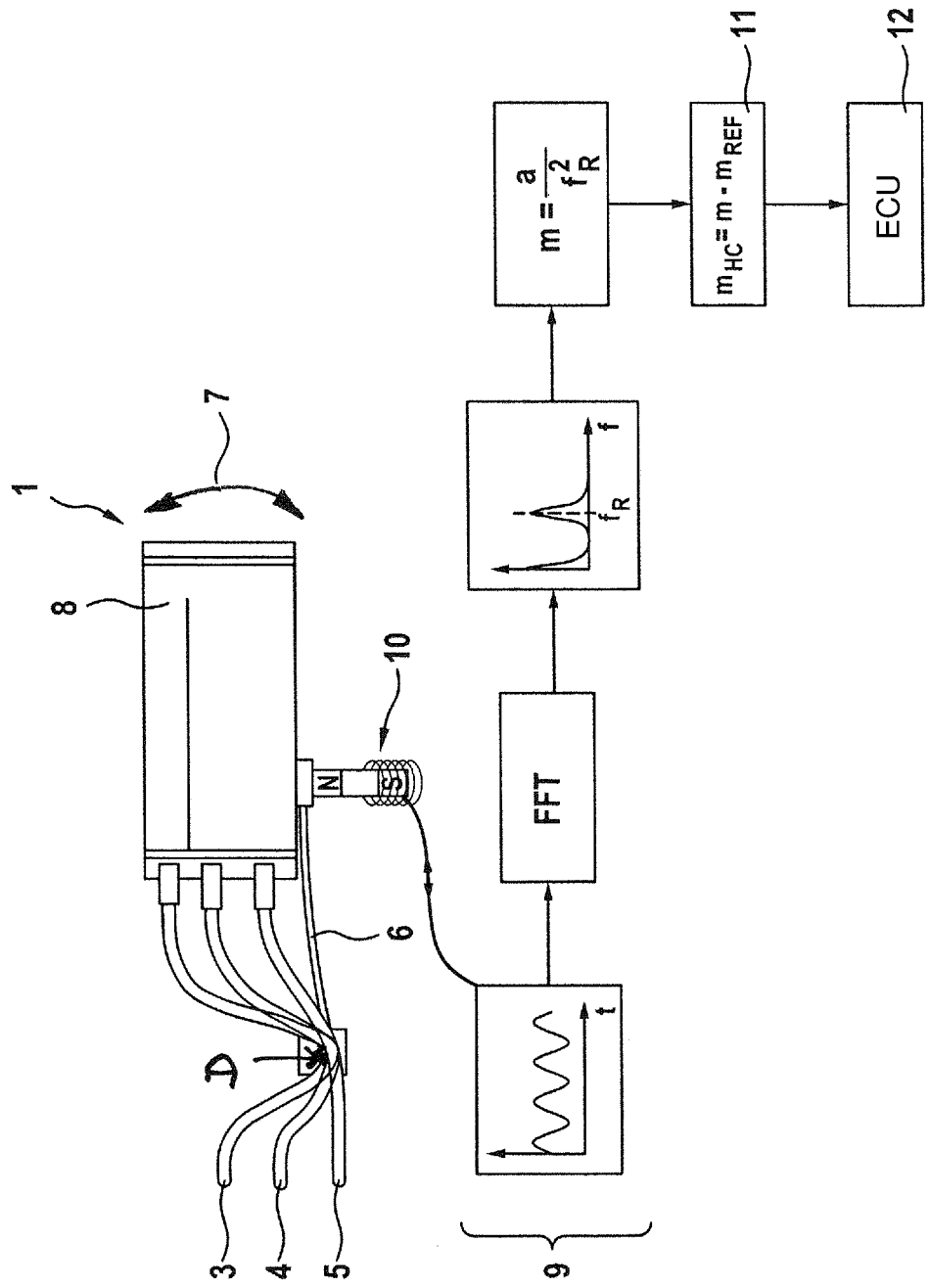
FIG. 4 is a view of a further embodiment as well as a representation concerning the operating method of the filter arrangement according to all embodiments.

In the form of a simplified block diagram for all embodiments, FIG. 4 is a schematic view of the method of operation of the filter arrangement 1; in addition, an alternative spring-mounted suspension of the filter 8 is also shown in this FIG. 4, specifically by way of a bending spring bar, which has the reference number 6. This bending spring bar 6 is clamped in firmly at the vehicle in a rotational axis point D, about which the filter 8 can then carry out oscillating rotational vibrations according to arrow 7, while the other end of this bending spring bar 6 carries the filter 8. Illustrated in a very abstracted manner, a magnetic coil sensor 10 is also provided in this end section, which is close to the filter, of the bending spring bar 6. This magnetic coil sensor 10 is a component of a sensor unit 9 which, preferably in a constructionally suitable manner, in its generality, is integrated in the spring-mounted suspension 6. The vibration 7 of the filter 8 can be measured by way of the magnetic coil sensor 10. By way of the magnetic coil sensor 10, as a result of a corresponding actuation of its magnetic coil, the filter 8 can be stimulated to carry out the vibration 7—however, this is only a facultative characteristic.

The sensor unit 9 includes corresponding arithmetic units in order to calculate the natural frequency from the measured vibration, for example, by Fast Fourier Transformation—this is illustrated in the block diagram of FIG. 4. Based on the natural frequency of the spring-mass system formed by the filter 8 with its spring-mounted suspension, as well as while taking into account that the natural frequency is inversely proportional to the square root of the mass or the weight, the weight of the filter 8 can be calculated. This calculated weight is forwarded to an analyzing unit 11.

The empty weight ($m_{REF}$) of the filter 8 is stored in this analyzing unit 11. By means of a simple calculation, the corresponding filling degree ($m_{HC}$) (also: loading degree) of the filter 8 can be calculated from the empty weight and the determined weight (m). The calculated filling degree is, in turn, forwarded to an engine control unit 12. Based on the filling degree, the engine control unit 12 can actuate the internal-combustion engine of the vehicle as well as conventionally in a manner known to a person skilled in the art, can actuate corresponding valves in the gas-conducting connections 3, 4, 5 and can thereby, for example, trigger the regeneration of the filter 8 by way of the second connection 4.

The invention therefore makes it possible to determine and to use the filling degree of a filter 8 within a vehicle 2. This results in the possibility that the filter 8, particularly constructed as an activated carbon filter, can be regenerated (also; rinsed) at an optimal point-in-time without interfering with the quiet running of the engine. It is no longer necessary to adapt the engine operating points in order to pass legal tests. This reduces the CO2 emission. Conversely, the invention permits a targeted loading of the filter, for example, if the fuel tank is a pressure tank system. In particular, it becomes possible to reduce the internal tank pressure and thereby relieve the fuel tank only if the filter condition is below a certain filling degree in order to ensure that no hydrocarbon is escapes into the environment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A filter arrangement of a vehicle, comprising:
a filter;
a spring-mounted suspension configured to swingably mount the filter in the vehicle;
a sensor unit that determines a variable corresponding to a current weight of the filter from a vibrational movement of the filter; and an analyzing unit that calculates a filling degree of the filter from the determined filter weight while taking into account an empty weight of the filter, wherein the filter is mounted to be swingably suspended about an axis of rotation fixed to the vehicle.

2. The filter arrangement according to claim 1, wherein the filter is an activated carbon filter.

3. The filter arrangement according to claim 1, wherein the axis of rotation extends through a housing of the filter or a rigid extension of the housing of the filter.

4. The filter arrangement according to claim 1, wherein the filter is mounted via a bending bar that is clamped in on one side and forms the axis of rotation at the clamped in location.

5. The filter arrangement according to claim 1, wherein
the variable determined by the sensor unit is a vibration of the filter, and
the sensor unit calculates a weight of the filter based on the determined vibration.

6. The filter arrangement according to claim 5, wherein the variable is a natural frequency of the vibration.

7. The filter arrangement according to claim 1, wherein the sensor unit comprises a magnetic coil sensor.

8. The filter arrangement according to claim 7, wherein the magnetic coil sensor is further configured as an actuator to stimulate vibration of the filter.

9. The filter arrangement according to claim 1, wherein the sensor unit is arranged in an area of the axis of rotation.

10. A vehicle, comprising:
a filter arrangement according to claim 1, wherein
one or both of the sensor unit and the analyzing unit are configured to determine the current weight of the vehicle when the vehicle is stopped via a braking operation such that the variable determined by the sensor unit is a vibration movement of the filter resulting from the braking operation.

11. A vehicle, comprising:
a tank of the vehicle;
an internal-combustion engine of the vehicle;
an engine control unit for the internal-combustion engine; and
a filter arrangement according to claim 1, wherein
the filter is configured to filter waste air from the tank,
the internal-combustion engine is connected with the filter to regenerate the filter, the engine receiving combustion air at least partially through the filter, and
the engine control unit is configured to feed air and/or fuel as a function of a currently calculated filling degree of the filter to the internal-combustion engine when regenerating the filter.

12. A method of operating a filter arrangement in a vehicle, the method comprising the acts of:
providing a filter for filtering waste air from a tank of the vehicle;
providing an internal-combustion engine connected with the filter; and
regenerating the filter via the internal-combustion engine by receiving combustion air at least partially through the filter, wherein
when regenerating the filter, air and/or fuel are controlled to be fed to the internal-combustion engine as a function of a currently determined filling degree of the filter, said currently determined filling degree of the filter being calculated from a determined filter weight while taking into account an empty weight of the filter.

13. The method according to claim 12, further comprising:
performing a calibration by:
determining the filter weight directly after a long regeneration phase of the filter,
storing the filter weight as an empty weight, and
factoring said empty weight into account during subsequent calculations of the filling degree of the filter.

14. A method of operating a filter arrangement in a vehicle, the method comprising the acts of:
providing a filter, which is mounted to be swingably suspended about an axis of rotation fixed to the vehicle, for filtering waste air from a tank of the vehicle;
providing an internal-combustion engine connected with the filter; and
regenerating the filter via the internal-combustion engine by receiving combustion air at least partially through the filter, wherein
air and/or fuel are fed to the internal-combustion engine when regenerating the filter as a function of a currently determined filling degree of the filter, said currently determined filling degree of the filter being calculated from a determined filter weight while taking into account an empty weight of the filter.

\* \* \* \* \*